Aug. 21, 1956     H. C. WINKEL     2,759,445
DEVICE FOR HOLDING BATTERY PLATES IN POSITION FOR BURNING
Filed June 18, 1951     7 Sheets-Sheet 1

Fig. 1

INVENTOR.
HERBERT C. WINKEL
BY

Aug. 21, 1956     H. C. WINKEL     2,759,445
DEVICE FOR HOLDING BATTERY PLATES IN POSITION FOR BURNING
Filed June 18, 1951.     7 Sheets-Sheet 2

INVENTOR.
HERBERT C. WINKEL
BY

Aug. 21, 1956     H. C. WINKEL     2,759,445
DEVICE FOR HOLDING BATTERY PLATES IN POSITION FOR BURNING
Filed June 18, 1951     7 Sheets-Sheet 3

*Fig. 4*

INVENTOR.
HERBERT C. WINKEL
BY

Aug. 21, 1956 H. C. WINKEL 2,759,445
DEVICE FOR HOLDING BATTERY PLATES IN POSITION FOR BURNING
Filed June 18, 1951 7 Sheets-Sheet 4

INVENTOR.
HERBERT C. WINKEL
BY

INVENTOR.
HERBERT C. WINKEL

Aug. 21, 1956    H. C. WINKEL    2,759,445
DEVICE FOR HOLDING BATTERY PLATES IN POSITION FOR BURNING
Filed June 18, 1951    7 Sheets-Sheet 6

Fig. 10

INVENTOR.
HERBERT C. WINKEL
BY

INVENTOR.
HERBERT C. WINKEL
BY
ATTORNEY

United States Patent Office 2,759,445
Patented Aug. 21, 1956

2,759,445

DEVICE FOR HOLDING BATTERY PLATES IN POSITION FOR BURNING

Herbert C. Winkel, Watervliet, Mich.

Application June 18, 1951, Serial No. 232,215

11 Claims. (Cl. 113—59)

This invention relates to a machine for holding a plurality of storage battery plates in position for fusing same together, and particularly to such a machine wherein there is provided a more positive and effective means for holding said plates in stacked relation to each other during the fusing period.

In the making of storage batteries, there is customarily employed the step of holding a number of battery plates in stacked relationship to each other, and while so held, fusing together the lugs which extend from each of said plates and bonding same to a battery terminal. This process is in the trade normally called "burning" and will be so referred to hereinafter for convenience.

For accomplishing this step under conditions demanding a high production rate, machines have been designed in which a number of such plates, suitably separated from each other by wooden dividers, are arranged in stacked relation to each other and clamped into a predetermined position. When so clamped into position, the lugs extending from each of said plates around which the metal is to be fused are caused to extend through means providing a plurality of slots, in the trade called "combs," by which the downward limit of movement of said metal is determined and other means are provided to function as a dam around the said lugs to limit sidewise movement of said metal. Lead is then melted within the zone bounded by said dam and bottomed by means defining the slots through which said lugs extend, and the lead fuses with the lugs and upon solidification forms a solid mass therein which mass includes all of said extending lugs.

In prior equipment of this general type, there has been present a serious problem of holding the several plates in such position for fusion.

It is desirable to provide a combination of parts by which the plates can be rapidly inserted into a set of combs, clamped into position, and the fusion obtained with a minimum of spoilage and a maximum of speed.

Thus, a principal object of the invention is the provision of a battery plate holding machine having clamping means which operate rapidly and accurately and which have no tendency to distort or misalign the plates.

A further object of the invention is to provide a battery plate holding machine, as aforesaid, in which the clamping device is positive and accurate.

A further object of the invention is to provide a battery plate holding device, as aforesaid, in which the plate holding mechanism is simple and yet may be operated with a maximum of speed.

A further object of the invention is to provide a battery plate holding device having improved clamping mechanism, as aforesaid, in which the other functions of the machine are retained unimpaired.

A further object of the invention is to provide a battery plate holding machine, as aforesaid, having a centrally located table which in one position will receive groups of storage battery plates, clamp them firmly into a preselected position, and which may then be rotated on a horizontal axis to present said plates in position for the burning operation.

A further object of the invention is to provide a battery plate holding machine, as aforesaid, in which the mechanism for turning said table is more accurate and yet comprises less parts than formerly known machines.

Other objects and purposes of the invention will be apparent to persons acquainted with apparatus of this general type upon inspection of the accompanying drawing and reading of the following disclosure.

General description

In my improved plate holding machine, there is provided a table rotatable about a horizontal axis. Said table has a pair of parallel, spaced, angle members extending longitudinally thereof, a set of comb members closing one side of the space defined between the spaced, parallel, flanges of said angle members, a series of U-shaped dividers defining a plurality of compartments between the spaced, parallel flanges of said angle members and a cover or closure member hingedly and removably affixed to assume a closed position intermediate said spaced flanges and spaced from said comb members in order to complete the enclosure of said plurality of battery plate receiving compartments. Said cover member has a plurality of spring elements mounted thereon and co-operating with and between the arms of said U-shaped members for assisting to hold plates and separators firmly and snugly in said compartments. Said machine may conveniently be provided with power means for opening and closing said comb members and for rotating said table, if desired.

Detailed description

The machine of the invention includes a frame 1 (Figure 1) having a table 2 supported thereon by a pair of shafts 3 and 4 by which said table may be caused to rotate about a horizontal axis with respect to said frame. Suitable bearings of any conventional type may be provided on said frame for the rotatable support of each of said shafts.

Said table comprises a pair of spaced, parallel side members 5 and 6 (Figure 7) which are affixed along their upper edges, to the top members 7 and 8 (Figures 4 and 7) in any conventional manner, as by welding. End plates 9 and 10 (Figure 2) connect the ends of these respective side elements to form a rectangular frame.

A pair of angle members 11 and 12 (Figure 7) are arranged parallel with each other and longitudinally of said table between said side elements. Their table surface flanges 13 and 14 are located in a common plane parallel with said top members and cooperate with the side members 5 and 6 in supporting the members defining the table top. The parallel, compartment defining flanges 15 and 16 of the angle members 11 and 12 are spaced from each other a distance sufficient to receive loosely therebetween the width of the largest size of battery plates and separators for which said machine is designed to be used. The parallel extension members 17 and 18 are positioned below and in alignment with and adjacent to the free edges of the compartment defining flanges 15 and 16 for extending said flanges sufficiently further to contact the entirety of the edges of the battery plates used therein and for longitudinal adjustment of compartment defining partitions as appearing hereinafter.

The partition members 19 are of generally U-shape with the outer edge of the web thereof substantially aligned with the table surface flanges of said angle members 11 and 12 and the arms of said partition members lie against the compartment defining flanges 15 and 16 of said angle members and the extension members 17 and 18.

Supported on the table surface flanges 13 and 14 (Figures 4 and 7) are the comb members and the dam members, and the means moving said comb members and dam members together and apart for surrounding each group of positive and negative battery plate pair of lugs A and B.

Figure 4:
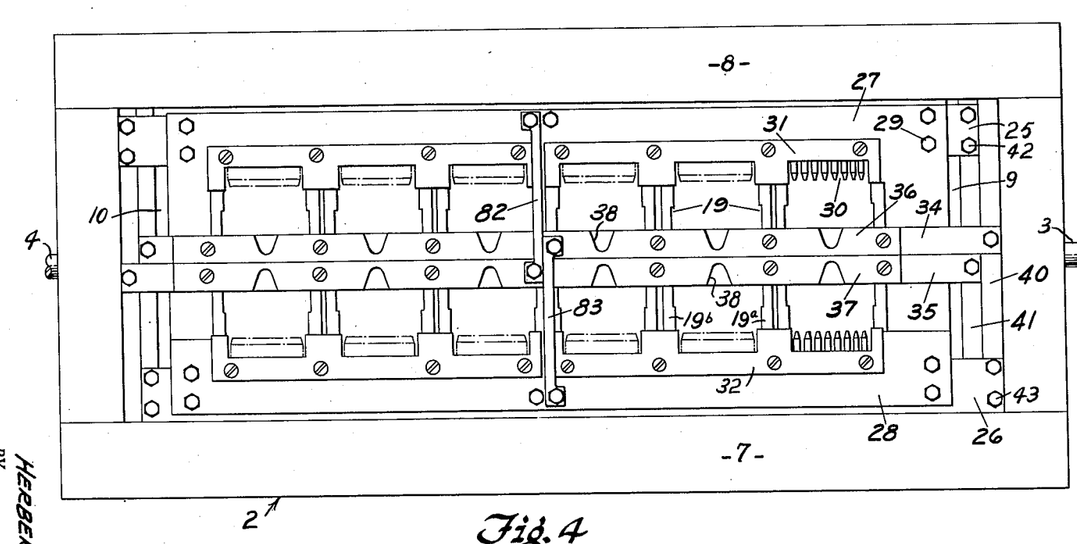
Figure 4 represents a top view of said machine similar to Figure 2 and showing the comb and dam elements in open position.
Figures 7, 8:
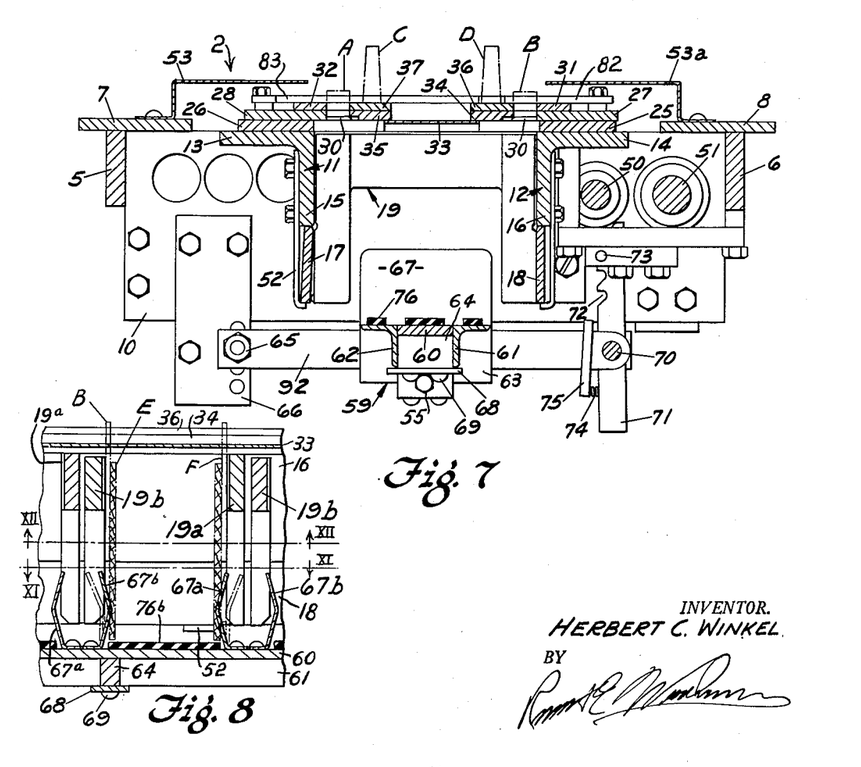
Figure 7 is a sectional view taken on the line VII—VII of Figure 3.
Figure 8 is a fragmentary sectional view taken on the line VIII—VIII of Figure 2 and showing in phantom two each of the battery plates and separator elements in the position occupied during the burning operation.

Slidably supported on the table surface flanges 14 and 13, respectively, is a pair of comb support members 25 and 26. Rigidly fixed on said comb support members is a pair of comb members 27 and 28, said last named members being affixed to the comb support members by any convenient means as the bolts 29 (Figure 4). These combs are provided with teeth as indicated at 30 for entering between and filling the space between the two rows of lugs A and B of battery plates F (Figures 7 and 8). Affixed rigidly to the top of the comb members are a pair of comb dams 31 and 32 (Figures 4 and 7) for providing one side of the means for retaining the pool of lead hereinafter mentioned.

Extending between the end plates 9 and 10 is a rest plate 33. Immediately above said rest plate are a pair of dam supporting bars 34 and 35 and supported above and on said dam supporting bars 34 and 35 are the dam members 36 and 37 which cooperate with the comb dams 31 and 32, respectively, to form a closed zone surrounding the lugs A and B of the battery plates F as hereinafter set forth in more detail. Recesses 38 are provided in said dam members 36 and 37 adjacent to and communicating with, each said zone. The positive and negative battery posts C and D are placed in these recesses for fusion with said pool of lead therein.

Figures 2, 3:
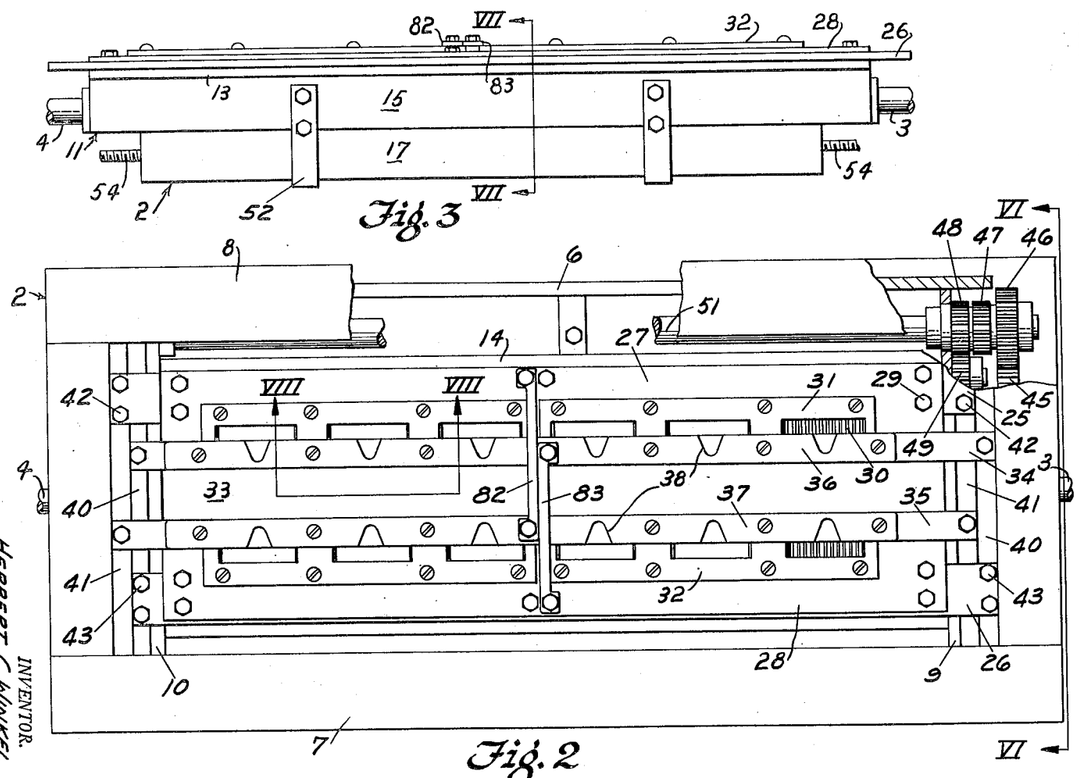
Figure 2 represents a top, partially broken, view of said embodiment of my invention showing the comb and dam elements thereof in closed position.
Figure 3 represents a side view of a portion of the rotatable table.

Any convenient means may be provided for moving said dam and comb members toward and away from each other to assume the positions respectively shown in Figures 2 and 4. In this particular embodiment of the invention, there are provided sliding racks 40 and 41 at both ends of the machine with which is associated suitable driving mechanism. The comb support member 25 is bolted at 42 to the racks 41 and the comb support member 26 is bolted at 43 to the racks 40. Similarly, the dam support bar 34 is bolted at its ends to the racks 40 and the dam support bar 35 is bolted at its ends to the racks 41. Thus, longitudinal reciprocating movement of said racks will open and close the respective comb and dam assemblies, of which there are two.

Figure 6:
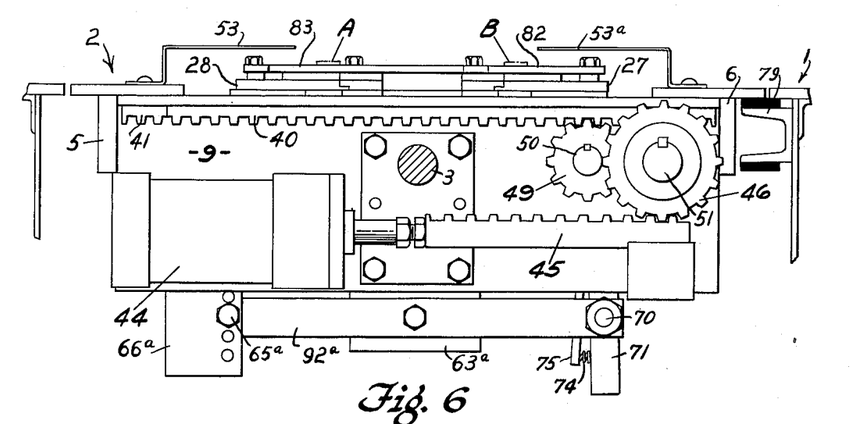
Figure 6 represents a right end view of the rotatable portion of said machine shown in its operating, or burning, position, as indicated in Figure 2.

Any convenient mechanism is provided for reciprocating said racks. In this particular embodiment (Figure 6) there is provided an air cylinder 44 operating a rack 45 which in turn operates a main gear 46. Said air cylinder is supplied from any conventional source, not shown, and is controlled by any conventional manually operated valve, as indicated at 39 in Figure 1.

Said main gear 46 operates a first rack gear 47 (Figure 2) which in turn operates the outer rack 40. Said main gear 46 is secured upon a shaft 51 common to the first rack gear 47 and an adjacent intermediate gear 48 which in turn engages a second rack gear 49 mounted on shaft 50. Said second rack gear 49 meshes with and operates the inner rack 41. Thus, as the piston of said cylinder 44 moves in one direction or the other, and thus causes the rack 45 to reciprocate, the rightward racks 40 and 41 are caused to reciprocate in opposite directions and thereby open or close the dam and comb assemblies.

In order to improve the accuracy of operation of these parts, the gear assembly just described is duplicated on the leftward end of the machine and is driven by the shafts 50 and 51 which in turn drive the racks 40 and 41 at the leftward end of the machine.

The guards 53 and 53a (Figure 7) are provided to close the space between the top members 7 and 8 and the adjacent comb support bars 26 and 25, respectively, in order to prevent the entry into such spaces of either dirt or workmen's fingers.

The tie bar 82 (Figures 2 and 4) is provided to assist in fixing the relative positions of the dam support bar 35 and the comb support bar 25, and the tie bar 83 assists in fixing the relative positions of the dam support bar 34 and the comb support bar 26. The use of these tie bars assists further in assuring precisely concurrent operation of the two dam and comb operating assemblies.

As best shown in Figures 4, 8, 11 and 12, the U-shaped partition members 19 are placed in pairs, which pairs are spaced apart. Half of said partition members, indicated by the numeral 19a is affixed, as by bolts, to the compartment defining flanges 15 and 16 of the angle members 11 and 12. This set of U-shaped partition members is, therefore, fixed with respect to the frame of the table. The remaining U-shaped partition members indicated at 19b are fastened, as by bolts, to the extension members 17 and 18, each member 19b being normally spaced from the corresponding member 19a of an adjacent pair, as appearing in Figure 8, sufficiently to receive a group of battery plates therebetween. The extension members are arranged for longitudinal sliding with respect to the angle members 11 and 12 and are supported in a manner to permit such sliding by a plurality of slide guides shown at 52 in Figures 1, 3 and 11. Longitudinal adjustment of said extension member, or slide, is controlled in any convenient manner, as by the bolts 54 (Figure 1) threadedly received into the end U-shaped members 19b and operating against the end plates 9 and 10.

Figure 1:
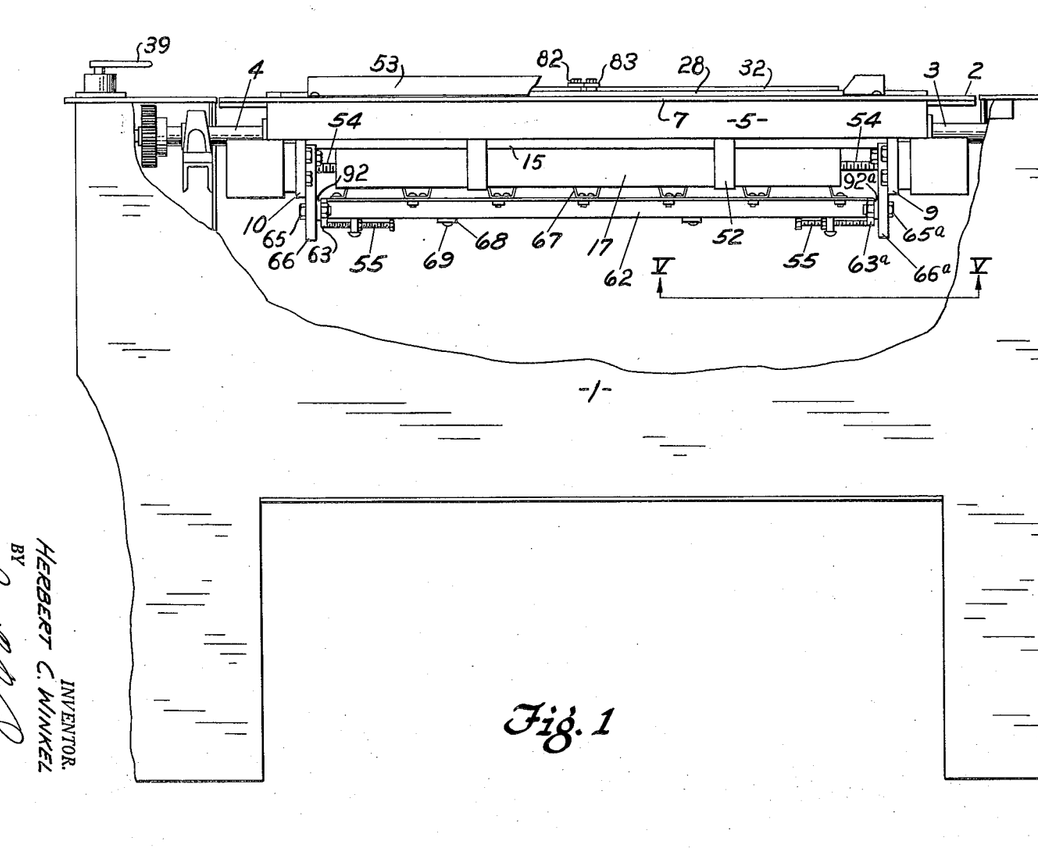
Figure 1 represents a partially broken side view of a typical embodiment of my invention.
Figure 5:
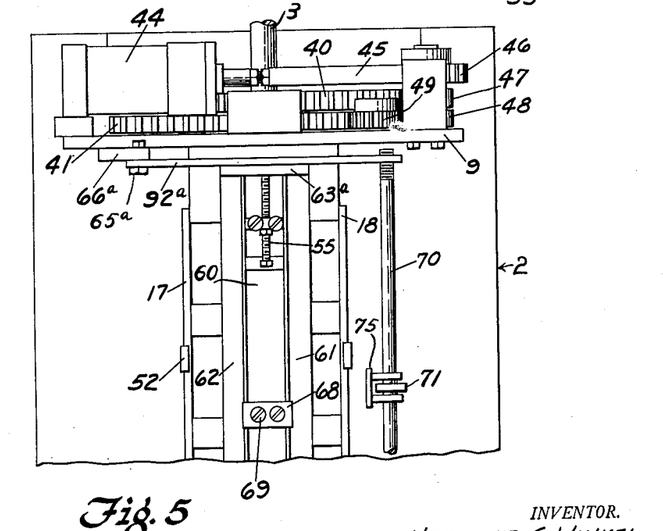
Figure 5 is a simplified fragmentary bottom view of one end of said table and the means for rotatably supporting same.

Turning now to the compartment closure member 59, (Figure 7), there is provided an elongated closure plate 60 which is flanked on either side by a pair of closure angle members 61 and 62. Said closure angle members are fixed in any convenient manner, as by welding, to end plates shown at 63 (Figures 1 and 7). Said end plates are fastened, as by a bolt, to the arms 92 (Figures 5 and 7). Said arms are pivotally fastened in any convenient manner as by a bolt 65 to a support plate 66, which in turn is fastened, as by bolts, to the end plate 10 of said table. Similar support is provided at the other end of the machine for the other end of the closure member 59. These additional support means for the closure member 59 are secured to the end plate 9 and are indicated by the numerals 63a, 65a, 66a and 92a.

A plurality of L-shaped spring elements 67, which are placed transversely of the closure member 59, are arranged to be substantially aligned with the several pairs of partition members 19. One group of such elements, indicated at 67a (Figure 8), is affixed in any convenient manner, as by bolting, to the closure angle members 61 and 62 and are accordingly substantially fixed with respect to the table, with respect to the lengthwise extent of the comb members 27 and 28 and with respect to the U-shaped partitions 19a with which they are aligned. The other group of L-shaped spring elements indicated at 67b is similarly arranged transversely to the closure member 59 but are fastened, as by bolting, to the movable closure plate 60 although they also extend across the co-planar flanges of said closure angle members. A plurality of spacer plates 68 (Figures 5, 7 and 8) are held against the lower edges of the parallel flanges of the closure angles 61 and 62 by the bolts 69 which enter into said closure plate 60. Several spacer bars 64 (Figures 7 and 8) are secured, as by welding, between the said parallel, opposing flanges of the closure angles 61 and 62 for slidably supporting the closure plate 60 therebetween. Said closure plate 60 is thereby held slidably in position, and may be moved longitudinally with respect to the co-planar flanges of the closure angles. The two groups of L-shaped spring members may be moved toward and away from each other by adjusting screws 55 at each end of the closure plate 60. Thus, adjustment for said spring members 67b is provided similarly to the corresponding adjustment provided for the partition member 19b and the apparatus may be adjusted for groups of battery plates of different sizes and quantities.

Figure 9:
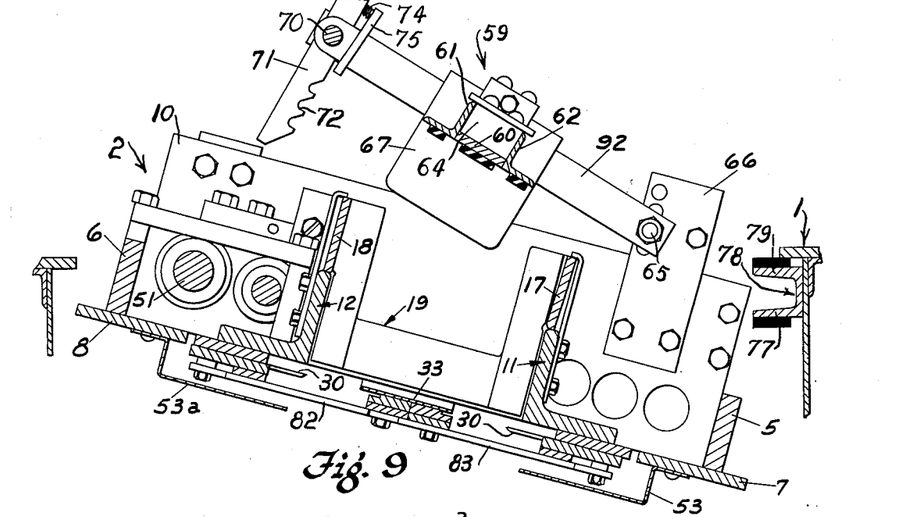
Figure 9 is a sectional view taken the same as Figure 7 and showing the table in a parially rotated position.

Any convenient means may be provided for holding said closure member 59 removably in position. In the specific embodiment here utilized the free ends of said arms 92 and 92a are connected by a rod 70 (Figures 5, 7 and 9) and one or more hook members 71 is pivotally mounted thereon. Said hook members 71 are provided with a plurality of hooks 72 which are adapted to engage a pin 73. The pin 73 may be fastened to the frame of the table 2 (Figure 7) in any convenient manner, as by welding, and extends lengthwise thereof. The hook 71 is held against the pin 73 by a spring 74 which bears against a plate 75. Said plate 75 is affixed to the rod 70 in any convenient manner, as by welding.

The pads 76 (Figures 8 and 11), made of any resilient material, such as sponge rubber, are preferably affixed to the upper sides of the closure plates 60 and closure angles 61 and 62 for engaging the edges of the battery plates F and separators E (Figure 8) being held by the mechanism, said pads 76 being of such length, as appearing at 76b in Figure 8, as not to interfere with the attachment of the spring members 67 to the closure plate 60 and the closure angle members 61 and 62. Any convenient means (not shown) either hand or power operated may be provided for rotating said table on its shafts 3 and 4, and for temporarily locking the table 2 in position as desired. When the table is in the loading position shown in Figure 10, it is preferably so positioned that the then uppermost surface of the rest plate 33 makes an angle of about 15 degrees to the horizontal. In this position, the top member 7 engages the lower flange 77 of the channel 78 secured to the frame. When the table 2 is in the burning position (Figure 7) the top member 8 engages the upper flange 79 of said channel 78.

*Operation*

Figure 10:
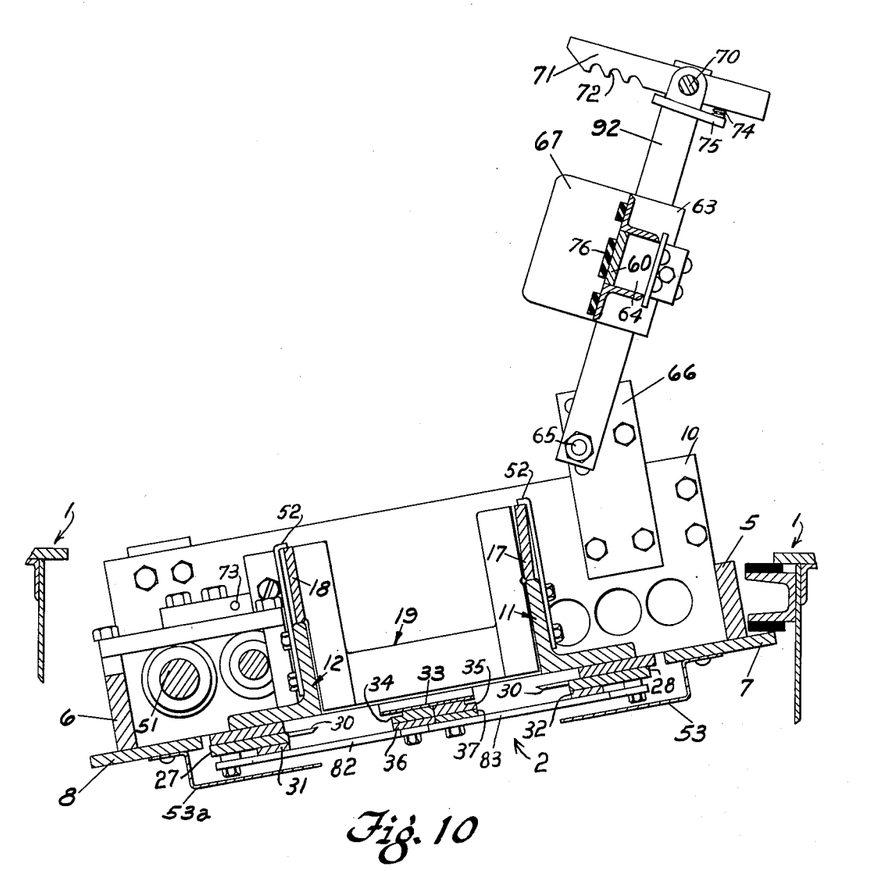
Figure 10 is a sectional view taken the same as Figure 7 but showing the table portion rotated into loading position, tilting forward approximately 15 degrees and showing the closure member opened.
Figure 11:
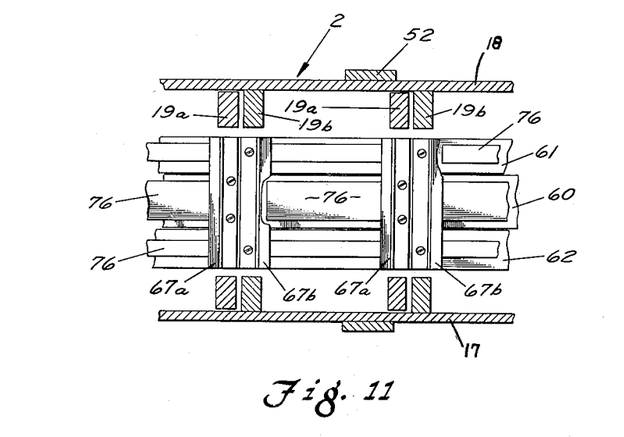
Figure 11 is a fragmentary, sectional, plan view taken on the line XI—XI of Figure 8.
Figure 12:
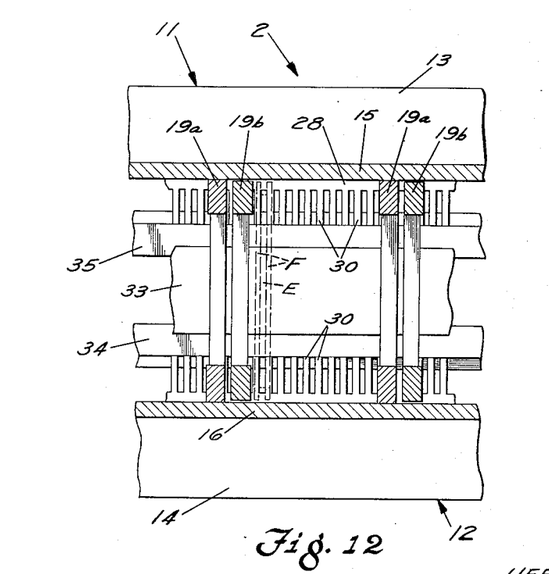
Figure 12 is a fragmentary, sectional view taken from the line XII—XII of Figure 8.

For convenience in reference, the position of the table 2 as appearing in Figure 7, has been referred to as its "burning" position and the inverted position, as appearing in Figure 10, has been referred to as its "loading" position, tilted 15 degrees to horizontal.

With the table 2 in its loading position, the movable group 19b of the U-shaped partition members is adjusted to form compartments of the proper length to receive the groups of battery plates F which the machine is to handle. This first adjustment permits groups of plates F and separators E to be held loosely in position against the rest plate 33 between the flanges 11 and 12, and the members 17 and 18 when loading. After this adjustment is completed by the rotation of the bolts 54, a similar adjustment is made with respect to the movable ones 67b of the L-shaped spring elements by adjusting the bolts 55. This second adjustment enables the groups of plates and separators, upon closing of the closure member 59, to become tightly held together by and against the L-shaped spring members and prevents plates and/or separators from slipping during the burning operation and the rotation of the table. The combination of these two adjustments creates a natural holding position for the battery groups which is extremely important in preventing any distortion of or strain on the plates when inserted into a battery cell. A battery cell, by virtue of its construction by molding, has a side taper, being narrower at the bottom. A battery plate group when burned in the machine herein disclosed will also have a similar taper and therefore will fit easily into a battery cell.

The closure member is then opened and groups of battery plates are inserted into the several compartments formed between the respective movable and non-movable U-shaped partition members, namely, between the right hand member 19a and the left hand member 19b, illustrated in Figure 8, where a group of battery plates F and the separators E are indicated as being positioned. The lugs A and B of said battery plates extend between the teeth of the combs 27 and 28 and assume the positions as shown in phantom in Figure 7. With the battery group in place, the L-shaped spring element 67 will assume the position shown in broken lines alongside of the solid-line showing thereof in Figure 8.

The air cylinder 44 is then energized and the rack 45 caused to move, thereby acting through the gears 46, 47, 48 and 49 to move the comb supporting member 25 and the dam supporting member 34 towards each other and the comb supporting member 26 and the dam supporting member 35 towards each other, whereby to close said combs and dams and cause them to form metal retaining compartments around the several groups of battery plate lugs A and B. After the combs and dams have closed, the closure member 59 is closed and the battery plates and separators held firmly in place.

The table is then rotated on its shafts 3 and 4 through approximately 195 degrees and brought into its burning position, namely, the position shown in Figures 1 and 7. The battery posts, indicated in phantom at C and D in Figure 7, are then placed into position adjacent said lugs A and B in the recesses 38, Figure 2. A suitable source of heat, such as a blow torch flame, is then directed along each of said groups of lugs and respectively adjacent battery terminal posts in the usual manner thereby fusing same together. Extra fusing, or burning, lead may be fed by hand if needed.

When the lead has melted and becomes smoothly spread in each respective compartment, has fully surrounded each of the several groups of lugs and battery posts, and has hardened, the table is again rotated into its loading position, the latch 71 disconnected and the closure member again opened. The combs and dams are moved away from each other by energization of said air cylinder 44 in the reverse direction and the several groups of battery plates, now firmly fastened together and to terminal posts, are removed. The machine is now in position for further loading and repetition of the cycle.

Therefore, I have now disclosed and described a machine capable of meeting the objectives above set forth.

While the particular preferred embodiment of my invention has been herein utilized for illustrative purposes, it should be clearly understood that the invention may be set forth in other particular machines and that, accordingly, the hereinafter appended claims should be construed to include the various possible variations of the particular embodiment herein expressly disclosed excepting as the claims by their terms expressly required otherwise.

I claim:

1. In a machine for burning a plurality of battery plate groups and for accurately arranging and positively holding the plates of each group in contiguous relationship with the lugs of one polarity in said group in a single row, whereby said lugs may be fused to each other and to a battery terminal, the combination comprising: a table and means supporting same for rotation about a horizontal axis; means defining an elongated compartment having parallel sidewalls and a bottom wall normal thereto and spaced therefrom, said compartment defining means being affixed to said table and the walls thereof being parallel with said axis; a plurality of partition members transversely disposed within said compartment, alternate partition members being affixed to said sidewalls at substantial intervals therealong; means slidably mounted upon said sidewalls for movement lengthwise thereof, the remainder of said partition members being affixed to said slidable means; a closure member hinged upon said table for movement about an axis parallel with said walls into and out of a clamping position spaced from and parallel with said bottom wall; a plurality of resilient elements mounted upon said closure member and extending into said compartment when said closure member is in said clamping position, part of said elements being affixed to said closure member in substantial alignment with said alternate partition members and the rest of said elements being adjustably mounted lengthwise of said closure member for substantial alignment with said remainder of partition members; a comb and dam assembly slidably supported upon said table adjacent to and exteriorly of said bottom wall for movement toward and away from each other in directions parallel with said bottom wall and transverse thereof; and means supported upon said table for effecting said movement.

2. In a machine for burning a plurality of battery plate groups and for accurately arranging and positively holding the plates of each group in contiguous relationship with the lugs of the alternately positive and negative plates of said groups aligned in two parallel rows, whereby said lugs in each row may be easily fused to each other and to battery terminals, the combination comprising: a table and means supporting same for rotation about a horizontal axis; means defining an elongated compartment having parallel sidewalls and a bottom wall normal thereto and spaced therefrom, said compartment defining means being affixed to said table and the walls thereof being parallel with said axis; a plurality of partition members transversely disposed within said compartment, alternate partition members being affixed to said sidewalls at substantial interval therealong; means slidably mounted upon said sidewalls for movement lengthwise thereof, the remainder of said partition members being affixed to said slidable means; a closure member hinged upon said table for movement about an axis parallel with said walls into and out of a clamping position spaced from and parallel with said bottom wall; a plurality of resilient elements mounted upon said closure member and extending into said compartment when said closure member is in said clamping position, part of said elements being affixed to said closure member in substantial alignment with said alternate partition members and the rest of said elements being adjustably mounted lengthwise of said closure member for substantial alignment with said remainder of partition members; a pair of cooperable comb and dam assemblies slidably supported upon said table adjacent to and exteriorly of said bottom wall, the comb and dam elements of each assembly being movable toward and away from each other in directions parallel with said bottom wall and transverse thereof; and actuation means supported upon said table for effecting simultaneously said movement of said assemblies.

3. The structure of claim 2 in which said sidewalls are defined, at least, in part by the vertical flanges of a pair of parallel angle members affixed to said table, the horizontal flanges of said angle members being co-planar and assisting in the support of said comb elements.

4. The structure of claim 3 in which said partition members are U-shaped and the webs and legs thereof are adjacent to said bottom wall and sidewalls, respectively; and in which said resilient elements extend between the legs of, and cooperate with, said partition members to hold said battery plates snugly and immovably in place within said compartment when said closure member is in clamping position.

5. The structure of claim 3 in which said partition members are U-shaped and the webs and legs thereof are adjacent to said bottom wall and sidewalls, respectively; and in which said resilient elements are equal in number to said partition members and extend between the legs thereof, when said closure member is in said clamping position, for cooperation with said partition members to hold said battery plates snugly and immovably together in groups of variable quantities.

6. The structure of claim 3 in which said closure member has a closure plate slidably disposed between the parallel, opposed flanges of a pair of closure angle members secured to said closure member, the other flanges of said angle members being co-planar with, and extending away from, said closure plate; and in which said resilient elements are L-shaped and disposed transversely of said closure plate and angles, the fixed resilient elements being secured by one flange of said L to the angle members and the adjustable resilient elements being similarly secured to said closure plate.

7. The structure of claim 3 in which said actuation means includes: an air cylinder; a driving rack reciprocable by said cylinder transversely of said bottom wall; a first driven rack affixed to one of said comb elements and one of said dam elements; a second driven rack affixed to the other comb element and the other dam element, said first and second racks being adjacent to each other, transverse of said bottom wall and parallel therewith; and geared means operable by said driving rack for simultaneously urging said first and second racks in opposite, lengthwise directions.

8. In a machine for burning a plurality of battery plate groups and for accurately arranging and positively holding the plates of each group in contiguous relationship with the lugs of the alternatively positive and negative plates of said groups aligned in two parallel rows, whereby said lugs in each row may be easily fused to each other and to battery terminals, the combination comprisng: a table and a frame rotatably supporting said table for movement about a horizontal axis through an arc of about 180 degrees; wall means affixed to said table and providing a pair of elongated, opposed surfaces lying on diametrically opposite sides of, and parallel with, said axis and within a pair of spaced parallel planes; a pair of extension members having opposed surfaces lying within said planes, and means holding said extension members adjacent to the lower edges of said wall means for lengthwise movement with respect thereto; an elongated rest plate spaced from and normal to said planes; said plate being spaced above said axis and adjacent to the upper edges of said wall means; a plurality of U-shaped, upwardly opening, partition members disposed transversely between said planes and adjacent to said rest plate, the legs of alternate partition members being affixed to said wall means at substantial intervals and the remaining partition members being secured to said extension members; an elongated closure member hinged upon said table for movement about an axis parallel with said table axis and having a closure surface movable into and out of a clamping position spaced from and substantially parallel with said rest plate, and means for holding said closure surface in said clamping position; a plurality of resilient elements mounted on said closure surface and extending between the legs of said partition members when said closure surface is in said clamping position, part of said resilient elements being adjustably mounted upon said closure surface for substantial alignment with said remaining partition members; a pair of cooperable comb and dam assemblies slidably supported upon said table adjacent to and above said rest plate, the comb and dam elements of each assembly being movable toward and away from each other in directions parallel with said rest plate and transverse thereof; and means supported upon said table for effecting simultaneously said movement of said assemblies.

9. In a machine for burning a plurality of battery plate groups and for accurately arranging and positively holding the plates of each group in predetermined relationship with the lugs of one polarity in said group in a single row, whereby said lugs may be fused to each other and to battery terminal, the combination comprising: a table rotatable from a loading position where the plates are received with the lugs downwardly to a burning position in which the lugs extend upwardly, means supporting said table for rotation about an axis which extends longitudinally of said table, said table including means defining two spaced, coplanar surfaces, said surfaces defining the plane of said table, means extending substantially at right angles to each of said surfaces defining generally parallel sidewalls of an elongated compartment, said elongated compartment extending longitudinally of said table and having open top and bottom walls; a plurality of partition members transversely disposed within said compartment; an elongated closure member mounted on said table for pivotal movement about an axis parallel to said longitudinal axis into and out of a clamping position wherein said member extends longitudinally of said table adjacent to and partially blocking said open top wall of said compartment, latch means on said closure member engageable with said table to hold said closure member in clamping position against said table, said closure member in its clamping position being adapted to engage and support the bottoms of said battery plate groups; comb means slidably supported on each of said two coplanar surfaces for movement toward and away from each other in a plane parallel to said plane of said table, means supported upon said table for moving said comb means; an elongated rest plate fixedly attached to said table, said rest plate extending longitudinally of said table above said compartment adjacent to and partially blocking said open bottom wall of said compartment, said rest plate being adapted to support said battery plate groups; dam means mounted above and for movement with said combs, means mounted on said rest plate cooperating with said dam means to limit the movement of the molten material during the fusing operation.

10. The machine of claim 9 wherein said elongated closure member includes an elongated, longitudinally extending closure plate, plate means parallel with and adjacent to said closure plate, means on said closure member mounting said closure plate and said plate means for relative movement, a plurality of spring elements transversely disposed within said compartment, each of said spring elements being adjacent one of said partition members, alternate spring elements being secured to said closure plate, the remainder of said spring elements being affixed to said plate means.

11. The machine of claim 10 in which said partition members are U-shaped, the legs of said U-shaped partition members being adjacent to said sidewalls and the web of said partition member being adjacent said rest plate, said spring elements extending between the legs of said partition members when said closure member is in its clamping position for cooperation with said partition members to hold said battery plates snugly and immovably together.

References Cited in the file of this patent

UNITED STATES PATENTS

| | | |
|---|---|---|
| 1,625,384 | Woodall et al. | Apr. 19, 1927 |
| 1,666,847 | Cote | Apr. 17, 1928 |
| 1,932,136 | Hole | Oct. 24, 1933 |
| 2,505,514 | Anderson | Apr. 25, 1950 |